US012729830B1

(12) United States Patent
Wu

(10) Patent No.: US 12,729,830 B1
(45) Date of Patent: Sep. 8, 2026

(54) MODULAR MULTI-LIGHT SOURCE GLARE-SHIELDING STRUCTURE AND LIGHT SOURCE MODULE USING THE SAME

(71) Applicants: HUIZHOU HANXING OPTOELECTRONICS TECHNOLOGY CO., LTD., Huizhou (CN); Hongge Wu, Qinhou (CN); LEDTURE INC., San Bernardino, CA (US)

(72) Inventor: Hongge Wu, Qinzhou (CN)

(73) Assignees: HUIZHOU HANXING OPTOELECTRONICS TECHNOLOGY CO., LTD., Huizhou (CN); LEDTURE INC., San Bernardino, CA (US)

(*) Notice: Subject to any disclaimer, the term of this patent is extended or adjusted under 35 U.S.C. 154(b) by 0 days.

(21) Appl. No.: 19/373,713

(22) Filed: Oct. 30, 2025

(30) Foreign Application Priority Data

Apr. 30, 2025 (CN) ........................ 202510568724.4

(51) Int. Cl.
*F21V 1/04* (2006.01)
*F21S 4/28* (2016.01)
(Continued)

(52) U.S. Cl.
CPC .................. *F21V 1/04* (2013.01); *F21S 4/28* (2016.01); *F21V 5/007* (2013.01); *F21V 11/06* (2013.01);
(Continued)

(58) Field of Classification Search
CPC ............ F21S 4/28; F21V 7/0083; F21V 11/06
See application file for complete search history.

(56) References Cited

U.S. PATENT DOCUMENTS 11,982,424 B1 * 5/2024 Lassen ...................... F21S 4/28
2014/0016315 A1 * 1/2014 Yu ......................... F21V 19/003 29/831
(Continued)

FOREIGN PATENT DOCUMENTS

DE 202009016793 U1 * 4/2011 .............. F21V 11/06
DE 102013219333 A1 * 3/2015 ................ F21S 4/28
(Continued)

*Primary Examiner* — Alexander K Garlen
(74) *Attorney, Agent, or Firm* — Ming Jiang; OPENPTO US LLC

(57) ABSTRACT

The present invention discloses a modular multi-light source glare-shielding structure for a light source module having multiple light sources arranged in a matrix on its light-emitting surface. The structure includes a base plate detachably installed on the light-emitting surface. The base plate features multiple through-holes, each corresponding to at least one light source, with opening sizes adapted to the light source's outer profile. A light-blocking mechanism is situated on the base plate, comprising light-blocking panels fixed to the base plate surface and vertically or obliquely positioned along at least one side of each through-hole's circumferential edge. This design physically restricts light diffusion, precisely constrains illumination areas, and suppresses stray light, achieving integrated high-precision local illumination and low glare.

8 Claims, 5 Drawing Sheets

(51) Int. Cl.

| | |
|---|---|
| ***F21V 5/00*** | (2018.01) |
| ***F21V 7/00*** | (2006.01) |
| ***F21V 11/06*** | (2006.01) |
| ***F21V 17/12*** | (2006.01) |
| ***F21V 29/508*** | (2015.01) |
| ***F21V 29/76*** | (2015.01) |
| ***F21Y 115/10*** | (2016.01) |

(52) U.S. Cl.
CPC ............ *F21V 17/12* (2013.01); *F21V 29/508* (2015.01); *F21V 29/767* (2015.01); *F21V 7/0083* (2013.01); *F21Y 2115/10* (2016.08)

(56) References Cited

U.S. PATENT DOCUMENTS

| | | | | |
|---|---|---|---|---|
| 2018/0328552 | A1* | 11/2018 | Meir | F21V 21/02 |
| 2019/0063723 | A1* | 2/2019 | Yamada | F21V 7/0083 |
| 2022/0299197 | A1* | 9/2022 | Henrici | G02B 19/0028 |
| 2022/0381421 | A1* | 12/2022 | Wang | F21V 5/007 |

FOREIGN PATENT DOCUMENTS

| | | | | |
|---|---|---|---|---|
| EP | 3312502 | A1 * | 4/2018 | F21V 19/002 |
| WO | WO-2009094819 | A1 * | 8/2009 | F21V 13/10 |

* cited by examiner

MODULAR MULTI-LIGHT SOURCE GLARE-SHIELDING STRUCTURE AND LIGHT SOURCE MODULE USING THE SAME

TECHNICAL FIELD

The present invention relates to the field of LED light source module technology, and more particularly to a modular multi-light source glare-shielding structure and a light source module using the same.

BACKGROUND

In public lighting scenarios, LED light source modules are widely adopted due to their high luminous efficacy and energy-saving advantages. However, the glare problem caused by their high brightness severely affects spatial positioning performance. Direct glare can cause temporary visual disability in the human eye, while indirect glare forms a light curtain effect through environmental reflection, leading to a decrease in the recognition of obstacles, signs, and paths by pedestrians or drivers in public areas (such as roads, squares, and transportation hubs), and even causing safety accidents due to visual disorientation. This "poor positioning" problem has become a prominent bottleneck restricting the deep application of LED lighting in complex public scenarios.

Existing anti-glare structures mostly rely on diffusers or glare shields, which limit the light diffusion angle through geometric blocking to reduce the interference of stray light on the surrounding environment. However, they suffer from the following problems:

(1) Traditional glare shields, honeycomb baffles, etc., require multiple layers of physical barriers around the light source, leading to volume expansion, and an overly large glare-shielding structure forces an increase in the overall size of the luminaire.

(2) For multi-light source matrix modules, traditional glare-shielding components are difficult to synchronously match the spatial positions of each light source's shielding, leading to weakened far-field light suppression capability. Furthermore, the overlapping of light spots from adjacent light sources and cross-interference from diffuse reflection cannot be eliminated, which intensifies the disorder of the light environment and significantly reduces positioning reliability.

The aforementioned defects make it difficult for existing technologies to achieve collaborative optimization of precise glare suppression and spatial positioning performance in complex lighting scenarios.

SUMMARY

To address the problems with existing technologies, the present invention provides a modular multi-light source glare-shielding structure and a light source module. This structure physically restricts the light diffusion angle by setting light-blocking panels around each light source, precisely delimiting the illumination area, and simultaneously suppressing stray light overflow, thereby achieving an integrated design of high-precision local illumination and low glare.

The specific technical solution of the present invention is as follows:

The present invention provides a modular multi-light source glare-shielding structure for a light source module, where multiple light sources are arranged in a matrix on the light-emitting surface of the light source module. The modular multi-light source glare-shielding structure includes a base plate installed on the light-emitting surface of a light source module using a detachable connection mechanism. Multiple light sources are arranged in a matrix on the light-emitting surface of the light source module. Multiple through-holes are opened on the base plate, each through-hole corresponding to at least one light source in the light source module, and the opening size of each through-hole is adapted to the outer profile size of the corresponding light source. A light-blocking mechanism is provided on the base plate, and the light-blocking mechanism includes at least one light-blocking panel fixed to the surface of the base plate and arranged vertically or obliquely along at least one side of the circumferential edge of the through-hole.

In some preferred technical solutions, the through-holes are small through-holes opened for each light source on the light source module. Alternatively, several adjacent light sources in the same horizontal row, the same vertical column, or the same diagonal direction are combined into a light source group, and the opening size of each through-hole is adapted to the outer profile size of the corresponding light source group.

In some preferred technical solutions, the light-blocking mechanism includes two configurations: a single-sided light-blocking unit and a ring-shaped light-blocking unit.

The single-sided light-blocking unit is a configuration where a light-blocking panel is provided on one side edge of a single through-hole, or on the same side edge of multiple through-holes linearly arranged along the length/radial direction of the base plate.

The ring-shaped light-blocking unit is a configuration of a multi-faceted light-blocking frame formed by multiple light-blocking panels surrounding the periphery of a single through-hole, or surrounding the periphery of a group of through-holes linearly arranged along the length/radial direction of the base plate.

In a preferred technical solution, the light-blocking mechanism is a four-sided light-blocking frame formed by four light-blocking panels surrounding the periphery of a group of through-holes linearly arranged along the radial direction of the base plate, and the number of through-holes in the through-hole group is two or more.

The four-sided light-blocking frame is formed by sequentially connecting and enclosing a first trapezoidal light-blocking surface, a first side trapezoidal light-blocking surface, a second trapezoidal light-blocking surface, and a second side trapezoidal light-blocking surface around the through-hole group, wherein the first trapezoidal light-blocking surface and the second trapezoidal light-blocking surface have the same shape and size and are arranged symmetrically, and the first side trapezoidal light-blocking surface and the second side trapezoidal light-blocking surface are arranged symmetrically.

Wherein, the axial height of the first trapezoidal light-blocking surface, the axial height of the second trapezoidal light-blocking surface, the axial height of the first side trapezoidal light-blocking surface, and the axial height of the second side trapezoidal light-blocking surface are all equal.

Further, the upper edges of the first trapezoidal light-blocking surface and the first side trapezoidal light-blocking surface respectively extend outwards along their planar directions to form rectangular extension parts.

In some preferred technical solutions, the inclination angles formed between the first trapezoidal light-blocking surface, the first side trapezoidal light-blocking surface, the second trapezoidal light-blocking surface, and the second side trapezoidal light-blocking surface, respectively, and the corresponding non-through-hole side base plate surfaces satisfy any of the following conditions:

The first trapezoidal light-blocking surface, the first side trapezoidal light-blocking surface, the second trapezoidal light-blocking surface, and the second side trapezoidal light-blocking surface each form equal inclination angles with their corresponding non-through-hole side base plate surfaces.

The first trapezoidal light-blocking surface and the second trapezoidal light-blocking surface each form an equal inclination angle $\alpha$ with the corresponding non-through-hole side base plate surface, and the first side trapezoidal light-blocking surface and the second side trapezoidal light-blocking surface each form an equal inclination angle $\beta$ with the corresponding non-through-hole side base plate surface, while inclination angle $\alpha$ and inclination angle $\beta$ are not equal.

The first trapezoidal light-blocking surface and the second trapezoidal light-blocking surface each form an equal inclination angle with the corresponding non-through-hole side base plate surface, and the first side trapezoidal light-blocking surface and the second side trapezoidal light-blocking surface each form unequal inclination angles with the corresponding non-through-hole side base plate surface.

In a preferred technical solution, screw holes are provided at both ends of the base plate along the length direction, and the base plate is connected to the light source module through fasteners passing through the screw holes. A pair of vertical slits are provided in the axial projection area corresponding to the screw holes on the first side trapezoidal light-blocking surface and/or the second side trapezoidal light-blocking surface, and the bottom of the same pair of vertical slits extends towards the opposing surface to form an arc-shaped curved section.

In a preferred technical solution, the axial sides of the base plate are provided with folded edges that bend vertically downwards to cover part of the side walls of the light source module. A display through-hole is opened on the base plate at the position corresponding to the light source irradiation direction mark on the upper surface of the light source module.

Both the base plate and the light-blocking mechanism are made of aluminum alloy, black glass fiber reinforced PC, or ABS plastic.

A second aspect of the present invention also discloses a light source module, comprising a heat sink, a circuit board tightly attached to the upper surface of the heat sink, a cover plate covering the circuit board, and a fixed frame connected to the heat sink and pressing the cover plate onto the heat sink. Multiple LED beads are arranged on the upper surface of the circuit board, and optical lenses are formed on the cover plate, covering the LED beads. Each LED bead and its overlying optical lens form a light source. The module also includes the modular multi-light source glare-shielding structure described above, with the base plate being detachably installed above the cover plate of the light source module using a detachable connection mechanism.

In some preferred technical solutions, the detachable connection mechanism includes at least one connection structure selected from a threaded fastener assembly, an elastic snap-fit assembly, and a pressing assembly. The threaded fastener assembly includes bolt holes correspondingly arranged on the edge of the base plate and the fixed frame of the light source module, along with matching fasteners. The elastic snap-fit assembly includes snap hooks provided on the periphery of the base plate and corresponding slots in the fixed frame of the light source module. The pressing assembly includes a pressing strip arranged along the edge of the base plate and a limiting groove cooperating with the fixed frame of the light source module.

Based on the inventive principles described above, the beneficial effects of the present invention are as follows:

The modular multi-light source glare-shielding structure of the present invention significantly improves the purity of luminous efficacy in local illumination areas by independently equipping each light source with a light-blocking mechanism, physically isolating the light paths of adjacent light sources, and directly blocking light spot overlap and diffuse reflection cross-interference. Compared to traditional large glare shields, the one-to-one light-blocking design can eliminate edge light leakage caused by tolerance accumulation in multi-light source modules, preventing the generation of secondary glare sources.

The light-blocking mechanism of the modular multi-light source glare-shielding structure of the present invention has good adaptability to geometric shapes. Parameters such as the inclination angle and vertical height of the light-blocking mechanism can be customized. By physically blocking, the light source divergence angle is limited, and the light diffusion range is confined within the target area, achieving precise control of light distribution.

The light-blocking mechanism and the base plate of the present invention quickly interface with the light source module through a detachable mechanism. The light-blocking mechanism adopts a split design, with each unit positioned close to its corresponding through-hole, reducing the module volume. This avoids the bulky problem of traditional integrated glare shields, making it suitable for compact space deployment. This design not only ensures the independent maintainability of the light path control components (e.g., cleaning or replacing the light-blocking mechanism) but also does not affect the heat dissipation path of the light source itself, balancing functionality with engineering practicality.

DETAILED DESCRIPTION

The present invention provides a modular multi-light source glare-shielding structure and a light source module. This structure utilizes through-holes on a detachable base plate to align with light source positions, and incorporates vertical or inclined light-blocking mechanisms along the edges of the through-holes. The modular design of the light-blocking mechanism reduces the overall module volume, achieving both compactness and precise glare shielding. Furthermore, the customizable height and inclination angle of the light-blocking mechanism confine the light diffusion range to the target area.

The content of the present invention will be further explained through the following embodiments, but it should not be construed as limiting the present invention. Any modifications or substitutions made to the methods, steps, or conditions of the present invention without departing from its spirit and essence shall fall within the scope of the present invention.

Figure 1:
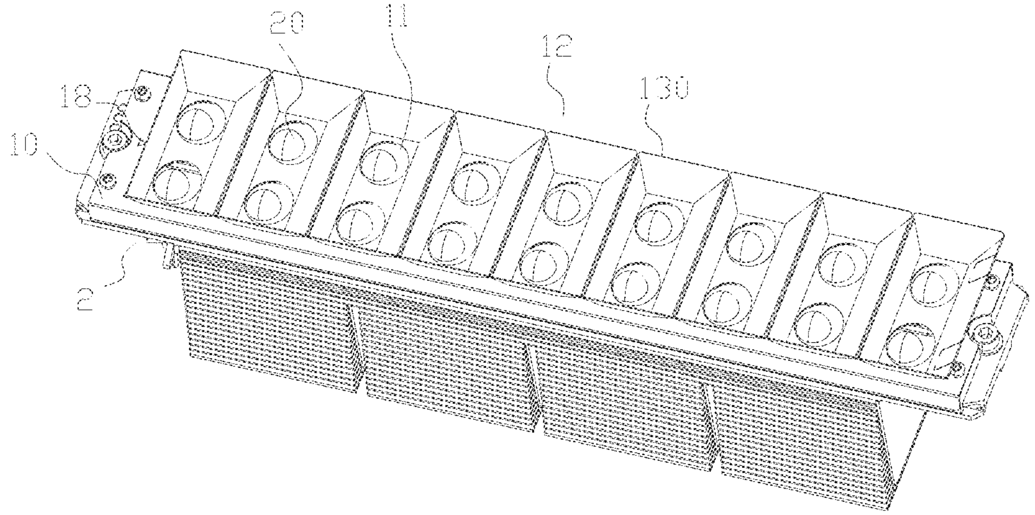
FIG. 1 is a schematic view of one embodiment of a light source module with a modular multi-light source glare-shielding structure according to the present invention.
Figure 2:
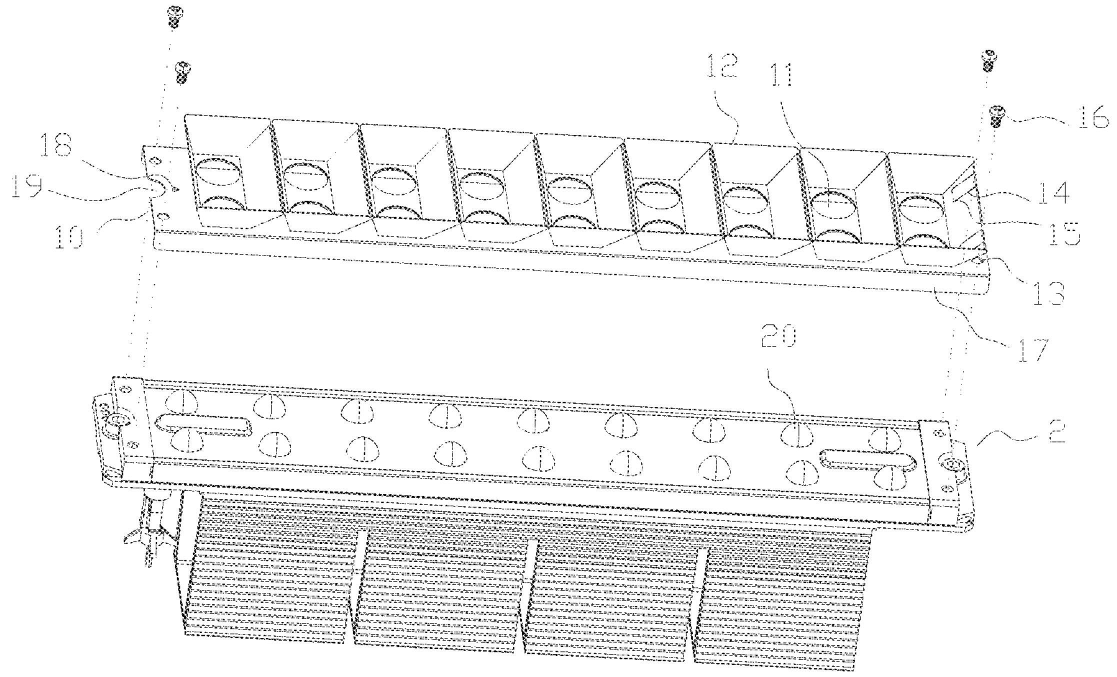
FIG. 2 is a partial exploded view of the light source module embodiment of FIG. 1.

Referring to FIGS. 1 and 2, a modular multi-light source glare-shielding structure for a light source module according to one embodiment of the present invention includes a base plate 10 installed on the light-emitting surface of a light source module 2 using a detachable connection mechanism. Multiple light sources 20 are arranged in a matrix on the light-emitting surface of the light source module 2. Multiple through-holes 11 are opened on the base plate 10, with each through-hole 11 corresponding to at least one light source 20 in the light source module 2. The opening size of each through-hole 11 is adapted to the outer profile size of the corresponding light source 20. Here, "light source adapted to the opening size of the through-hole 11" should be understood as at least one light source 20. When a through-hole 11 corresponds to two or more light sources, the opening size of the through-hole 11 should be adapted to the outer profile range encompassing the two or more light sources. The opening size of the through-hole 11 must ensure that the corresponding light source 20 is fully exposed, and that the orthographic projection area of the corresponding light source 20 in the direction normal to the plane of the base plate is not obstructed by the base plate 10. A light-blocking mechanism 12 is provided on the base plate 10. The light-blocking mechanism 12 includes a light-blocking panel fixed to the surface of the base plate 10 and arranged vertically or obliquely along at least one side of the circumferential edge of each through-hole 11.

This structure replaces traditional external glare grilles with a detachable base plate, reducing the overall thickness of the module, making it particularly suitable for embedded installations or space-constrained scenarios, and avoiding positioning deviations caused by luminaire displacement. The design of this base plate can handle multiple light sources simultaneously, with each through-hole corresponding to a single or multiple light sources. The light-blocking panels independently physically block the light paths of each light source, preventing light spot overlap and diffuse reflection cross-interference between adjacent light sources.

The through-hole 11 structure includes two technical solutions:

The first type: The through-holes 11 are small through-holes opened for each light source on the light source module 2, as shown in FIG. 1. The number of small through-holes is equal to the number of light sources 20. The opening shape and size of each small through-hole match the outer contour of the corresponding light source 20, ensuring that the light source is fully exposed and not obstructed by the base plate 10.

Figure 3:
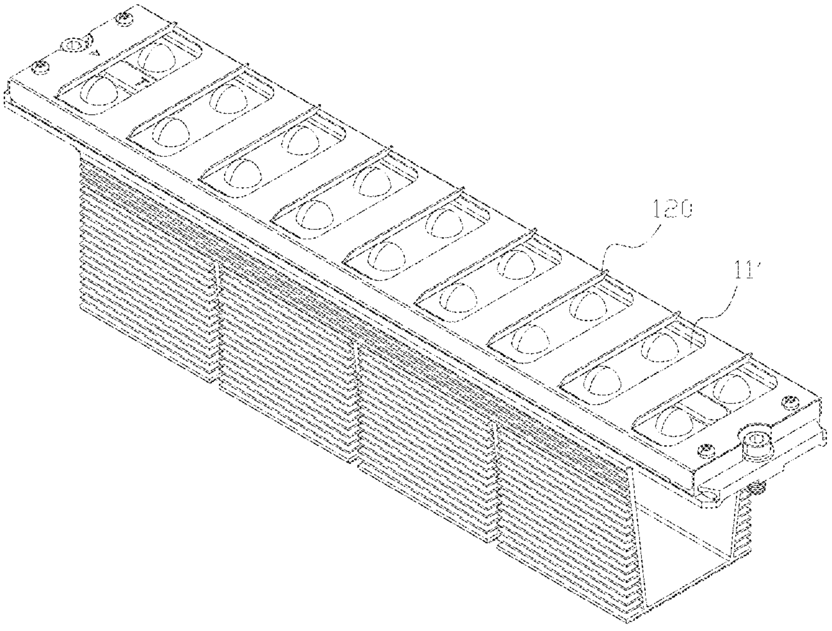
FIG. 3 is a schematic view of another embodiment of a light source module with a modular multi-light source glare-shielding structure according to the present invention.

The second type: Several adjacent light sources 20 in the same horizontal row, the same vertical column, or the same diagonal direction are combined into a light source group, such as two light sources 20 arranged side-by-side forming a light source group, as shown in FIG. 3. The opening size of each through-hole 11' is adapted to the outer profile size of the corresponding light source group. The opening size of each through-hole 11' on the base plate 10 is adapted to the total outer contour size of the entire light source group, i.e., covering the maximum boundary range of all combined light sources.

The light-blocking mechanism 12 is used to physically block stray side light from the light source, and its configuration is designed based on the requirements of the actual application scenario. The light-blocking mechanism 12 mainly includes two configurations: a single-sided light-blocking unit 120 and a ring-shaped light-blocking unit 130.

The single-sided light-blocking unit 120 is a configuration where a light-blocking panel is provided on one side edge of a single through-hole, or on the same side edge of multiple through-holes linearly arranged along the length/radial direction of the base plate 10. Its basic forms are:

The single-sided light-blocking unit 120 is a light-blocking panel provided on one side edge of a single through-hole 11'. In this case, the light-blocking panels for each through-hole 11' are discontinuous, as shown in FIG. 3. The light-blocking panel only blocks one side edge of each through-hole 11', such as the left, right, upper, or lower side.

Figure 4:
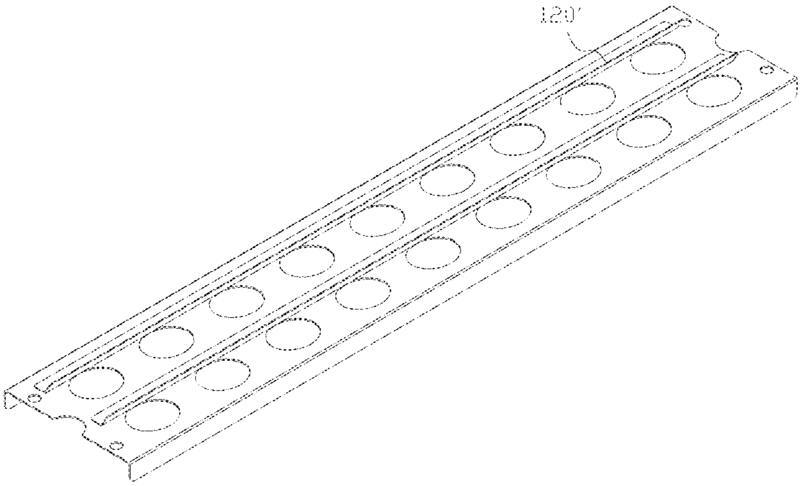
FIG. 4 is a schematic view of one embodiment of the modular multi-light source glare-shielding structure according to the present invention.

Alternatively, the single-sided light-blocking unit 120' is a single light-blocking panel provided on the same side edge of multiple through-holes 11 linearly arranged along the length or radial direction of the base plate 10, as shown in FIG. 4. The light-blocking panel extends continuously along the same side edge of the through-holes 11 in the same linear direction, forming a long strip-shaped light-blocking panel. The form of the light-blocking panel can be a vertical plate or a light-blocking plate with a certain inclination angle. The single-sided light-blocking mechanism physically blocks side light from the light source, reducing the diffusion of stray light in non-target directions and eliminating glare. It should be noted that the radial direction mentioned herein refers to the direction perpendicular to the long side of the base plate.

The ring-shaped light-blocking unit 130 is configured as a multi-faceted light-blocking frame formed by multiple light-blocking panels surrounding the periphery of a single through-hole 11, or surrounding the periphery of a group of through-holes linearly arranged along the length/radial direction of the base plate, where the through-hole group includes at least two through-holes 11. Its basic forms are specifically:

The ring-shaped light-blocking unit 130 is a closed frame configuration of a multi-faceted light-blocking frame formed by multiple light-blocking surfaces surrounding the periphery of a single through-hole 11;

Alternatively, it is a closed frame configuration of a multi-faceted light-blocking frame surrounding the periphery of a group of through-holes linearly arranged along the length or radial direction of the base plate 10. Referring to FIG. 1, the ring-shaped light-blocking unit 130 surrounds the periphery of two through-holes 11 linearly arranged along the radial direction of the base plate 10.

In addition to forming a multi-faceted light-blocking frame structure, it can also be designed with a circular cross-section or other curved surface structures, provided its function is maintained. The ring-shaped frame structure enclosed by the ring-shaped light-blocking unit physically restricts the light diffusion range of light originally scattered in all directions to the effective illumination area, reducing stray light loss in non-target directions, and blocking light propagation from the light source to unintended directions through the setting of the inclination angles of the various light-blocking panels.

Figure 5A:
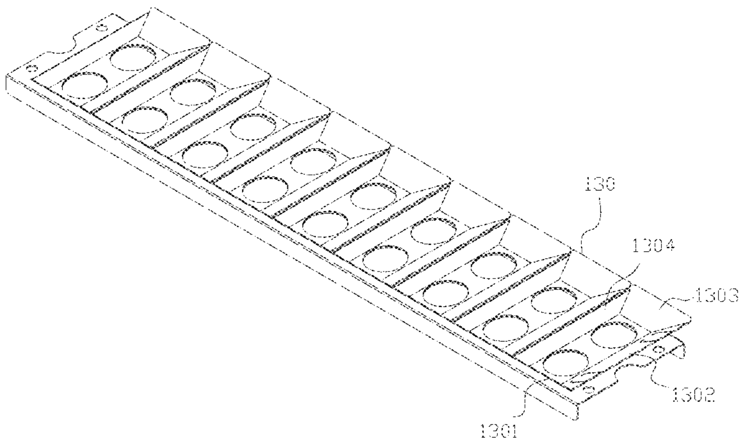
FIGS. 5*a*-5*b* are schematic views of two embodiments of the annular light-blocking unit according to the present invention.
Figure 5B:
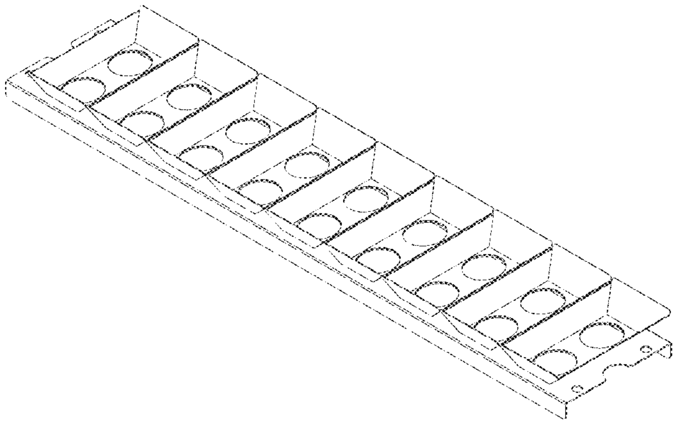

In some specific examples of the present invention, the light-blocking mechanism utilizes the ring-shaped light-blocking unit 130, specifically a four-sided light-blocking frame formed by four light-blocking panels surrounding the periphery of a group of through-holes linearly arranged along the radial direction of the base plate, where the through-hole group consists of two through-holes. The spacing between the two through-holes is designed according to the optical requirements of the light source module. Specifically, as shown in FIG. 5*a*, the four-sided light-blocking frame is formed by sequentially connecting and enclosing a first trapezoidal light-blocking surface 1301, a first side trapezoidal light-blocking surface 1302, a second trapezoidal light-blocking surface 1303, and a second side trapezoidal light-blocking surface 1304 around the through-hole group. The first trapezoidal light-blocking surface 1301 and the second trapezoidal light-blocking surface 1303 have the same shape and size and are arranged symmetrically, and the first side trapezoidal light-blocking surface 1302 and the second side trapezoidal light-blocking surface 1304 are arranged symmetrically.

The axial heights of the first trapezoidal light-blocking surface 1301, the first side trapezoidal light-blocking surface 1302, the second trapezoidal light-blocking surface 1303, and the second side trapezoidal light-blocking surface 1304 are set according to the application scenario and can be all equal, all unequal, or partially equal. The inclination angles formed between the first trapezoidal light-blocking surface 1301, the first side trapezoidal light-blocking surface 1302, the second trapezoidal light-blocking surface 1303, and the second side trapezoidal light-blocking surface 1304, respectively, and their corresponding non-through-hole side base plate surfaces are set according to the application scenario and can be all equal, all unequal, or partially equal. That is, the axial heights of the first trapezoidal light-blocking surface 1301, the first side trapezoidal light-blocking surface 1302, the second trapezoidal light-blocking surface 1303, and the second side trapezoidal light-blocking surface 1304 of the four-sided light-blocking frame, and the inclination angles formed between them and their corresponding non-through-hole side base plate surfaces, are all non-limiting design parameters. Their specific values can be dynamically adjusted according to the optical requirements, spatial constraints, and performance indicators of the actual application scenario.

The design logic is as follows:

Glare Level Control: By increasing the height of the light-blocking surface or adjusting its inclination angle, the physical blocking effect on direct light from specific viewing angles is enhanced.

Light Distribution Shape: The inclination angle formed between the light-blocking surface and the corresponding non-through-hole side base plate surface affects the light diffusion range. A small inclination angle (e.g.,) 30° can expand the shaded coverage area, while a large angle (e.g.,) 75° can reduce the light diffusion angle.

To ensure consistent shielding boundaries for multiple light sources within a light-blocking structure designed for a light source module with multiple light sources, the four rectangular inclined surfaces can be defined as follows. The axial heights of the first trapezoidal light-blocking surface, the first side trapezoidal light-blocking surface, the second trapezoidal light-blocking surface, and the second side trapezoidal light-blocking surface can satisfy any of the following conditions:

(1) The axial heights of the first trapezoidal light-blocking surface, the second trapezoidal light-blocking surface, the first side trapezoidal light-blocking surface, and the second side trapezoidal light-blocking surface are all equal. This ensures consistent light-blocking surface height in all directions, providing balanced shielding intensity in all directions and forming a uniform light spot.

Figure 6A:
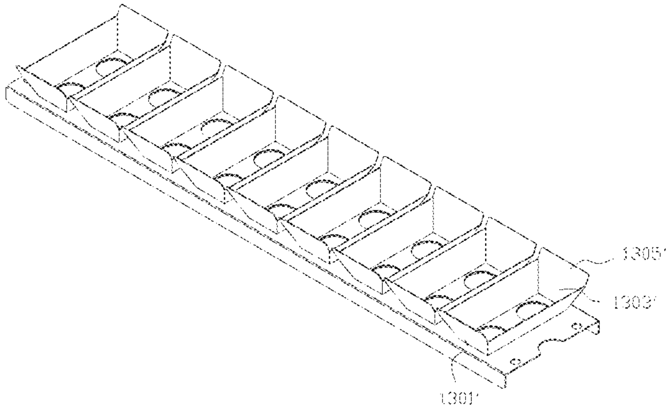
FIGS. 6*a*-6*b* are schematic views of two other embodiments of the annular light-blocking unit according to the present invention.
Figure 6B:
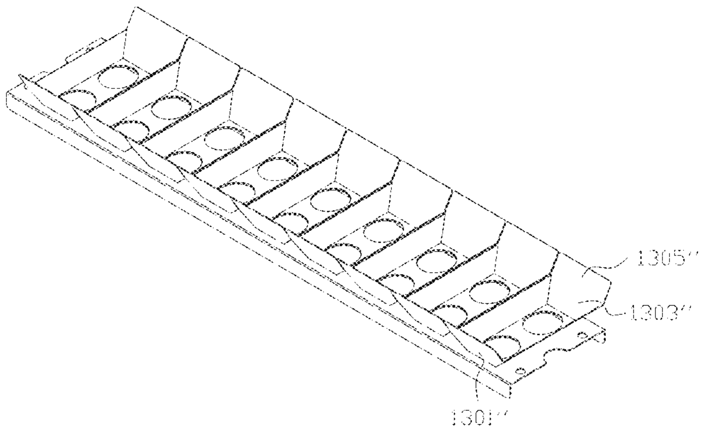

(2) The axial heights of the first trapezoidal light-blocking surface and the second trapezoidal light-blocking surface are equal, and the axial heights of the first side trapezoidal light-blocking surface and the second side trapezoidal light-blocking surface are equal, while the axial heights of the trapezoidal light-blocking surfaces and the side trapezoidal light-blocking surfaces are not equal. As shown in FIGS. 6*a* and 6*b*, the upper edges of the first trapezoidal light-blocking surface 1301', 1301" and the second trapezoidal light-blocking surface 1303', 1303" respectively extend outwards along their planar directions to form rectangular extension parts 1305', 1305". For example, if the axial heights of the first and second trapezoidal light-blocking surfaces are both 3 cm, and the axial heights of the first and second side trapezoidal light-blocking surfaces are both 2 cm, the taller trapezoidal light-blocking surfaces enhance the constraint on light diffusion in the illumination direction, while the shorter side trapezoidal light-blocking surfaces allow partial lateral light diffusion to meet wide-area illumination needs.

In further limitations, the inclination angles formed between the first trapezoidal light-blocking surface, the first side trapezoidal light-blocking surface, the second trapezoidal light-blocking surface, and the second side trapezoidal light-blocking surface, respectively, and their corresponding non-through-hole side base plate surfaces can satisfy any of the following conditions:

(1) The first trapezoidal light-blocking surface, the first side trapezoidal light-blocking surface, the second trapezoidal light-blocking surface, and the second side trapezoidal light-blocking surface each form equal inclination angles with their corresponding non-through-hole side base plate surfaces.

(2) The first trapezoidal light-blocking surface and the second trapezoidal light-blocking surface each form an equal inclination angle $\alpha$ with the corresponding non-through-hole side base plate surface, and the first side trapezoidal light-blocking surface and the second side trapezoidal light-blocking surface each form an equal inclination angle $\beta$ with the corresponding non-through-hole side base plate surface, while inclination angle $\alpha$ and inclination angle $\beta$ are not equal. This solution can strengthen the physical shielding effect on non-target areas, especially for specific environmental light interference directions (e.g., streetlights needing to shield illumination towards residential areas along the road).

(3) The first trapezoidal light-blocking surface and the second trapezoidal light-blocking surface each form an equal inclination angle with the corresponding non-through-hole side base plate surface, and the first side trapezoidal light-blocking surface and the second side trapezoidal light-blocking surface each form unequal inclination angles with the corresponding non-through-hole side base plate surface. By combining asymmetric trapezoidal light-blocking surface angles, the light diffusion range can be constrained to form a shielding boundary adapted to irregularly shaped illumination areas. For multi-viewpoint usage scenarios (e.g., multi-seat lighting in stadiums), differentiated inclination angle settings achieve glare suppression for specific viewing angles.

The present invention describes a base plate that connects to the light source module via a detachable connection mechanism. In one example, the base plate is secured to the light source module using screw holes and fasteners at both ends along its length. A pair of vertical slits are provided in the axial projection area corresponding to the screw holes on the first side trapezoidal light-blocking surface and/or the second side trapezoidal light-blocking surface.

Referring to FIG. 2, a pair of vertical slits 14 are located in the axial projection area corresponding to the screw holes 13 on the first side trapezoidal light-blocking surface or the second side trapezoidal light-blocking surface. The bottom of these vertical slits 14 extends towards opposing surfaces to form an arc-shaped curved section 15. The base plate is then connected to the frame of the light source module using fasteners 16.

When the angle between the first or second side trapezoidal light-blocking surface and the non-through-hole side of the base plate is a small acute angle, the orthographic projection of the first or second side trapezoidal light-blocking surface partially overlaps with the axial projection area of the screw holes 13, making disassembly and assembly difficult due to partial obstruction by the base plate. By incorporating a pair of vertical slits 14 into the first or second side trapezoidal light-blocking surface, when the base plate 10 needs to be disassembled or assembled, the portion of the base plate 10 between the vertical slits 14 can be pushed inward and downward, allowing for easier access for the removal or installation process.

The base plate 10 also features folded edges 17 on its axial sides, which bend vertically downward to cover a portion of the side walls of the light source module. To further ensure the secure installation of the base plate, blocking block and slot connections or screw fastenings can be additionally implemented between the folded edges 17 and the corresponding side walls of the light source module.

Figure 7:
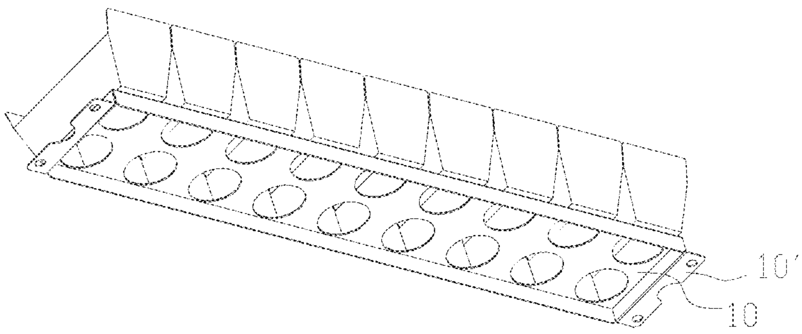
FIG. 7 is a schematic view of an embodiment where the base plate has a cuboid structure.
Figure 8:
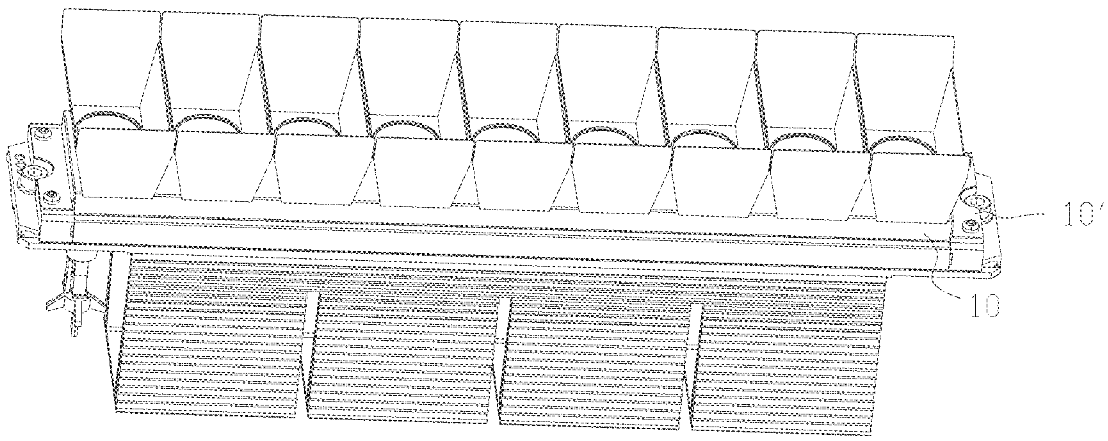
FIG. 8 is a schematic view of the structure of FIG. 7 in an assembled state with a light source module.

While the base plate 10 is generally flat, its form can be modified to adapt to the shape of the corresponding light source module it's assembled with. In one example, referring to FIGS. 7 and 8, to accommodate an overall outwardly convex cuboid cover plate of the light source module, the base plate 10 is folded downward on all four sides, forming an open-bottomed cuboid structure. This allows the entire base plate to enclose the cuboid cover plate of the light source module. In this configuration, secondary folded edges 10' are formed horizontally outwards on both sides of the cuboid bottom of the base plate 10. These secondary folded edges 10' are then fitted with screw holes for fastening to the frame of the light source module.

Further refinements to the base plate 10 structure are detailed in this example. The base plate 10 includes a display through-hole 18 at the position corresponding to the light source irradiation direction mark on the upper surface of the light source module, as shown by the triangular display through-hole 18 in FIG. 2. This feature aids installers by clearly indicating identification information. Additionally, the middle of both end edges of the base plate 10 has an arc-shaped concave groove 19 designed to accommodate the mounting screws of the light source module frame.

Figure 9:
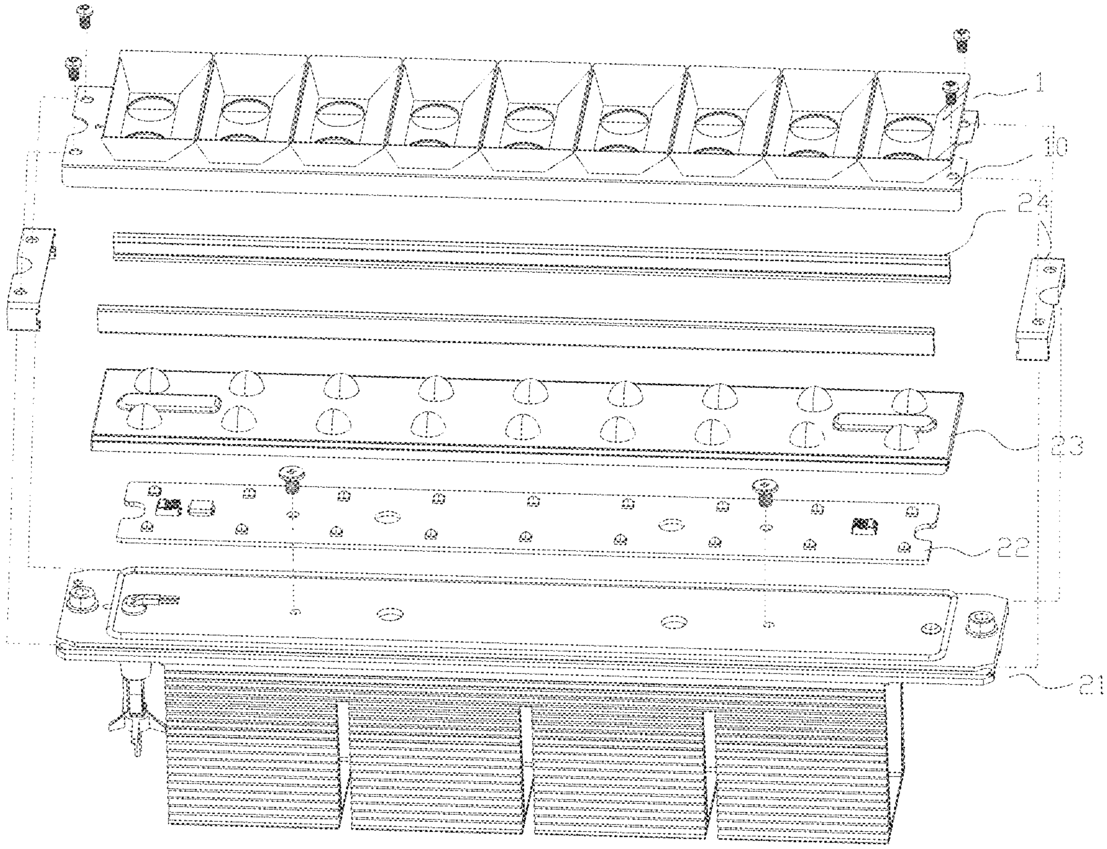
FIG. 9 is an exploded view of the light source module according to the present invention.

A second aspect of the present invention discloses a light source module equipped with the aforementioned modular multi-light source glare-shielding structure. Referring to FIG. 9, the light source module 2 comprises a heat sink 21, a circuit board 22 tightly attached to the upper surface of the heat sink 21, a cover plate 23 covering the circuit board 22, and a fixed frame 24 connected to the heat sink 21 that secures the periphery of the cover plate 23 to the heat sink 21. Multiple LED beads are arranged on the upper surface of the circuit board 22, and optical lenses are formed on the cover plate 23, covering the LED beads. Each LED bead and its overlying optical lens together form a light source 20. The module also includes the modular multi-light source glare-shielding structure 1 described above, where the base plate 10 is installed above the cover plate 23 of the light source module 2 using a detachable connection mechanism.

The detachable connection mechanism can employ conventional mechanical structures used in this field, specifically including at least one connection structure selected from a threaded fastener assembly, an elastic snap-fit assembly, and a pressing assembly. Referring to FIG. 9, the threaded fastener assembly includes bolt holes correspondingly arranged on the edge of the base plate 10 and the fixed frame 24 of the light source module, along with matching fasteners. In other embodiments, the elastic snap-fit assembly includes snap hooks provided on the periphery of the base plate and corresponding slots in the fixed frame of the light source module. The pressing assembly includes a pressing strip arranged along the edge of the base plate and a limiting groove cooperating with the fixed frame of the light source module.

Figure 10A:
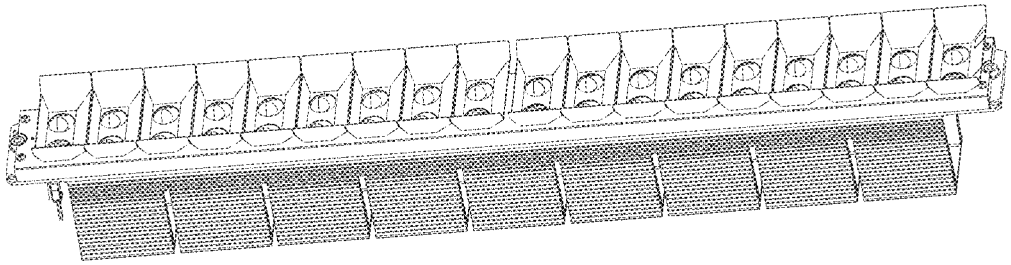
FIGS. 10*a*-10*b* are schematic views of the modular multi-light source glare-shielding structure installed on two light source modules.
Figure 10B:
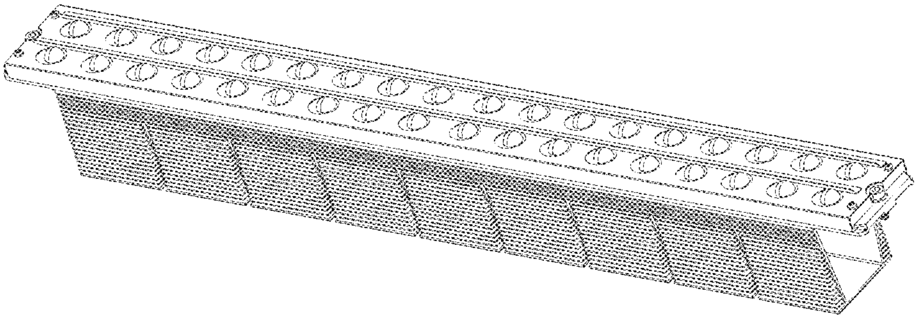

It should be noted that the overall shape of the modular multi-light source glare-shielding structure can be adapted to match the size and shape of the light-emitting surface of a single light source module in a luminaire, or it can be adapted to match the size and shape of the light-emitting surfaces of all light source modules in a luminaire. The latter implies that when a luminaire has only one light source module, the anti-glare structure is short, and its overall shape matches the light-emitting surface of a single light source module. When a luminaire has two or more light source modules, the anti-glare structure is long, ensuring that the overall shape of the modular multi-light source glare-shielding structure matches the combined shape of the multiple corresponding light source modules' light-emitting surfaces, as shown in FIGS. 10*a* and 10*b*.

It is also important to note that the base plate of the modular multi-light source glare-shielding structure of the present invention needs to possess a certain mechanical strength to support the light-blocking mechanism, and it also requires heat dissipation because it is positioned close to the light source module, which typically generates heat. The light-blocking panels need to exhibit good shielding performance and reduce reflective glare through surface anti-glare treatment (such as a matte texture or light-absorbing coating). Both the base plate and the light-blocking mechanism can be made of aluminum alloy or high-temperature resistant engineering plastics (such as black PC, PBT, PA, ABS, etc.), ensuring sufficient mechanical strength and heat dissipation while being easy to process and install. When both the base plate and the light-blocking mechanism are made of aluminum alloy, they are connected by welding. When the base plate is made of PC or glass fiber-reinforced PC, and the light-blocking panels are made of black PC or light-absorbing PBT, they can be formed integrally by injection molding or connected mechanically. In other embodiments, if the base plate uses aluminum alloy and the light-blocking panels use plastic, welding is not suitable, and the light-blocking panels are secured by snaps or adhesive.

The light source module of the present invention, equipped with the modular multi-light source glare-shielding structure, effectively suppresses glare and constrains the light diffusion range through its physical shielding function. The asymmetric light-blocking structure further enhances light blocking in non-target areas. For instance, in street lighting applications, the asymmetric light-blocking structure can prevent light from irradiating residential areas along the road while ensuring effective road illumination.

The various embodiments in this specification are described in a progressive manner. Similar parts between the embodiments can be cross-referenced, with each embodiment focusing on highlighting differences from other embodiments. Particularly, for apparatus embodiments, since they are fundamentally similar to method embodiments, their descriptions are relatively simple, and relevant aspects can be referred to in the partial descriptions of the method embodiments.

The foregoing describes only specific embodiments of the present invention, but the scope of protection of the present invention is not limited thereto. Any changes or substitutions easily conceivable by those skilled in the art within the technical scope disclosed by the present invention should be covered by the scope of protection of the present invention. Therefore, the scope of protection of the present invention should be determined by the scope of the claims.

The invention claimed is:

1. A modular multi-light source glare-shielding structure for a light source module, the light source module comprising a plurality of light sources arranged in a matrix on a light-emitting surface thereof, comprising:

a base plate configured to be installed on the light-emitting surface of the light source module via a detachable connection mechanism;

wherein the base plate defines a plurality of through-holes, each through-hole corresponding to at least one light source of the light source module, and an opening size of each through-hole is adapted to an outer profile size of the corresponding light source; and a light-blocking mechanism disposed on the base plate, the light-blocking mechanism comprising a light-blocking panel fixedly attached to a surface of the base plate and arranged vertically or obliquely along at least one side of a circumferential edge of the through-hole;

wherein the light-blocking mechanism is a four-sided light-blocking frame formed by four light-blocking panels surrounding a periphery of a through-hole group linearly arranged along a radial direction of the base plate, and a number of through-holes in the through-hole group is two or more;

wherein the four-sided light-blocking frame is formed by sequentially connecting and enclosing a first trapezoidal light-blocking surface, a first side trapezoidal light-blocking surface, a second trapezoidal light-blocking surface, and a second side trapezoidal light-blocking surface around the through-hole group, wherein the first trapezoidal light-blocking surface and the second trapezoidal light-blocking surface have a same shape and size and are symmetrically arranged, and the first side trapezoidal light-blocking surface and the second side trapezoidal light-blocking surface are symmetrically arranged;

wherein an axial height of the first trapezoidal light-blocking surface, an axial height of the second trapezoidal light-blocking surface, an axial height of the first side trapezoidal light-blocking surface, and an axial height of the second side trapezoidal light-blocking surface are all equal;

wherein the base plate defines screw holes at both ends along a length direction thereof, and the base plate is connected to the light source module via fasteners passing through the screw holes;

wherein a pair of vertical slits are provided in an axial projection area corresponding to the screw holes on at least one of the first side trapezoidal light-blocking surface and the second side trapezoidal light-blocking surface, and a bottom of the pair of vertical slits extends towards opposing surfaces to form an arc-shaped curved section.

2. The modular multi-light source glare-shielding structure of claim 1, wherein:

each of the plurality of through-holes is a through-hole opened for each light source on the light source module; or a plurality of adjacent light sources arranged in a same horizontal row, a same vertical column, or a same diagonal direction are combined into a light source group, and an opening size of each through-hole is adapted to an outer profile size of the corresponding light source group.

3. The modular multi-light source glare-shielding structure of claim 1, wherein upper edges of the first trapezoidal light-blocking surface and the first side trapezoidal light-blocking surface respectively extend outwards along their planar directions to form rectangular extension parts.

4. The modular multi-light source glare-shielding structure of claim 1, wherein inclination angles formed between the first trapezoidal light-blocking surface, the first side trapezoidal light-blocking surface, the second trapezoidal light-blocking surface, and the second side trapezoidal light-blocking surface, respectively, and corresponding non-through-hole side base plate surfaces satisfy any one of the following conditions:

the first trapezoidal light-blocking surface, the first side trapezoidal light-blocking surface, the second trapezoidal light-blocking surface, and the second side trapezoidal light-blocking surface each form equal inclination angles with the corresponding non-through-hole side base plate surfaces;

the first trapezoidal light-blocking surface and the second trapezoidal light-blocking surface each form an equal inclination angle $\alpha$ with the corresponding non-through-hole side base plate surfaces, and the first side trapezoidal light-blocking surface and the second side trapezoidal light-blocking surface each form an equal inclination angle $\beta$ with the corresponding non-through-hole side base plate surfaces, and the inclination angle $\alpha$ and the inclination angle $\beta$ are unequal; or the first trapezoidal light-blocking surface and the second trapezoidal light-blocking surface each form an equal inclination angle with the corresponding non-through-hole side base plate surfaces, and the first side trapezoidal light-blocking surface and the second side trapezoidal light-blocking surface each form unequal inclination angles with the corresponding non-through-hole side base plate surfaces.

5. The modular multi-light source glare-shielding structure of claim 1, wherein axial sides of the base plate comprise folded edges bent vertically downwards to cover a portion of side walls of the light source module;

wherein the base plate defines a display through-hole at a position corresponding to a light source irradiation direction mark on an upper surface of the light source module; and wherein the base plate and the light-blocking mechanism are both made of aluminum alloy, black glass fiber reinforced PC, or ABS plastic.

6. A light source module, comprising:

a heat sink;

a circuit board tightly attached to an upper surface of the heat sink;

a cover plate covering the circuit board;

a fixed frame connected to the heat sink and configured to secure a periphery of the cover plate to the heat sink;

a plurality of LED beads disposed on an upper surface of the circuit board;

an optical lens formed on the cover plate and covering each of the plurality of LED beads, wherein each of the plurality of LED beads and its overlying optical lens together form a light source;

further comprising a modular multi-light source glare-shielding structure, wherein the modular multi-light source glare-shielding structure comprises:

a base plate, wherein the base plate defines a plurality of through-holes, each through-hole corresponding to at least one light source of the light source module, and an opening size of each through-hole is adapted to an outer profile size of the corresponding light source; and a light-blocking mechanism disposed on the base plate, the light-blocking mechanism comprising a light-blocking panel fixedly attached to a surface of the base plate and arranged vertically or obliquely along at least one side of a circumferential edge of the through-hole;

wherein the base plate is installed above the cover plate of the light source module via a detachable connection mechanism;

wherein the light-blocking mechanism is a four-sided light-blocking frame formed by four light-blocking panels surrounding a periphery of a through-hole group linearly arranged along a radial direction of the base plate, and a number of through-holes in the through-hole group is two or more;

wherein the four-sided light-blocking frame is formed by sequentially connecting and enclosing a first trapezoidal light-blocking surface, a first side trapezoidal light-blocking surface, a second trapezoidal light-blocking surface, and a second side trapezoidal light-blocking surface around the through-hole group, wherein the first trapezoidal light-blocking surface and the second trapezoidal light-blocking surface have a same shape and size and are symmetrically arranged, and the first side trapezoidal light-blocking surface and the second side trapezoidal light-blocking surface are symmetrically arranged;

wherein an axial height of the first trapezoidal light-blocking surface, an axial height of the second trapezoidal light-blocking surface, an axial height of the first side trapezoidal light-blocking surface, and an axial height of the second side trapezoidal light-blocking surface are all equal;

wherein the base plate defines screw holes at both ends along a length direction thereof, and the base plate is connected to the light source module via fasteners passing through the screw holes;

wherein a pair of vertical slits are provided in an axial projection area corresponding to the screw holes on at least one of the first side trapezoidal light-blocking surface and the second side trapezoidal light-blocking surface, and a bottom of the pair of vertical slits extends towards opposing surfaces to form an arc-shaped curved section.

7. The light source module of claim 6, wherein the detachable connection mechanism comprises at least one of a threaded fastener assembly, an elastic snap-fit assembly, and a pressing assembly.

8. The light source module of claim 7, wherein the detachable connection mechanism comprises the threaded fastener assembly, and the threaded fastener assembly includes bolt holes correspondingly arranged on an edge of the base plate and the fixed frame of the light source module, and matching fasteners.

* * * * *